US011068339B2

(12) United States Patent
Raj et al.

(10) Patent No.: US 11,068,339 B2
(45) Date of Patent: *Jul. 20, 2021

(54) READ FROM MEMORY INSTRUCTIONS, PROCESSORS, METHODS, AND SYSTEMS, THAT DO NOT TAKE EXCEPTION ON DEFECTIVE DATA

(71) Applicant: Intel Corporation, Santa Clara, CA (US)

(72) Inventors: Ashok Raj, Portland, OR (US); Ron Gabor, Herzliya (IL); Hisham Shafi, Akko (IL); Sergiu Ghetie, Hillsboro, OR (US); Mohan J. Kumar, Aloha, OR (US); Theodros Yigzaw, Sherwood, OR (US); Sarathy Jayakumar, Portland, OR (US); Neeraj S. Upasani, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,555

(22) Filed: May 20, 2019

(65) Prior Publication Data

US 2019/0272214 A1 Sep. 5, 2019

Related U.S. Application Data

(63) Continuation of application No. 15/201,438, filed on Jul. 2, 2016, now Pat. No. 10,296,416.

(51) Int. Cl.
*G06F 11/00* (2006.01)
*G06F 11/10* (2006.01)
*G06F 11/07* (2006.01)

(52) U.S. Cl.
CPC ...... *G06F 11/1048* (2013.01); *G06F 11/0721* (2013.01)

(58) Field of Classification Search
CPC .... G06F 11/1044; G06F 11/108; G06F 11/07; G06F 11/0721; G06F 11/0727;
(Continued)

(56) References Cited

U.S. PATENT DOCUMENTS 6,085,339 A 7/2000 Jeddeloh
6,092,182 A 7/2000 Mahalingaiah
(Continued)

FOREIGN PATENT DOCUMENTS

WO 2008118705 A1 10/2008

OTHER PUBLICATIONS

Intel 64 and IA-32 Architectures Software Developer's Manual, vol. 1, 2A, 2B, 2C, 3A, 3B and 3C, Jun. 2014, vol. 2B—pp. 4-305 to 4-308.
(Continued)

*Primary Examiner* — Joseph D Manoskey
(74) *Attorney, Agent, or Firm* — NDWE, LLP

(57) ABSTRACT

A processor of an aspect includes a decode unit to decode a read from memory instruction. The read from memory instruction is to indicate a source memory operand and a destination storage location. The processor also includes an execution unit coupled with the decode unit. The execution unit, in response to the read from memory instruction, is to read data from the source memory operand, store an indication of defective data in an architecturally visible storage location, when the data is defective, and complete execution of the read from memory instruction without causing an exceptional condition, when the data is defective. Other processors, methods, systems, and instructions are disclosed.

20 Claims, 13 Drawing Sheets

(58) Field of Classification Search
CPC .... G06F 11/073; G06F 11/10; G06F 11/1004; G06F 11/1052; G06F 11/1048; G06F 3/0619; G06F 3/064; G06F 3/068; G06F 12/0875; G06F 12/0893; G06F 12/1045; G06F 2212/45; G06F 2212/06
See application file for complete search history.

(56) References Cited

U.S. PATENT DOCUMENTS

| | | | |
|---|---|---|---|
| 6,625,756 | B1 | 9/2003 | Grochowski et al. |
| 6,934,903 | B1 | 8/2005 | Keltcher et al. |
| 7,802,078 | B2 | 9/2010 | Henry et al. |
| 2005/0120265 | A1 | 6/2005 | Pline et al. |
| 2009/0204766 | A1 | 8/2009 | Jacobi et al. |
| 2012/0311379 | A1 | 12/2012 | Moyer et al. |
| 2014/0071575 | A1 | 3/2014 | Parker et al. |
| 2014/0195396 | A1 | 7/2014 | Bhakta et al. |
| 2015/0261590 | A1* | 9/2015 | Sperber ............... G06F 11/079 714/42 |
| 2016/0179611 | A1 | 6/2016 | Le et al. |
| 2016/0179651 | A1 | 6/2016 | Corbal et al. |
| 2017/0153959 | A1* | 6/2017 | Zbiciak ............... G06F 9/30036 |
| 2017/0177429 | A1 | 6/2017 | Stark et al. |
| 2017/0285959 | A1 | 10/2017 | Mishaeli |

OTHER PUBLICATIONS

Intel 64 and IA-32 Architectures Software Developer's Manual, vol. 3A: System Programming Guide, Part 1, Order No. 253668-039US, May 2011, Chapter 15, vol. 3A—pp. from 15-1 to 15-48.
International Preliminary Report on Patentability for Application No. PCT/US2017/036040, dated Jan. 17, 2019, 6 pages.
International Search Report and Written Opinion for Application No. PCT/US2017/036040, dated Sep. 25, 2017 ,7 pages.
Non-Final Office Action from U.S. Appl. No. 15/201,438, dated Apr. 4, 2018, 15 pages.
Notice of Allowance from U.S. Appl. No. 15/201,438, dated Jan. 10, 2019, 9 pages.
Notice of Allowance from U.S. Appl. No. 15/201,438, dated Mar. 21, 2019, 6 pages.

* cited by examiner

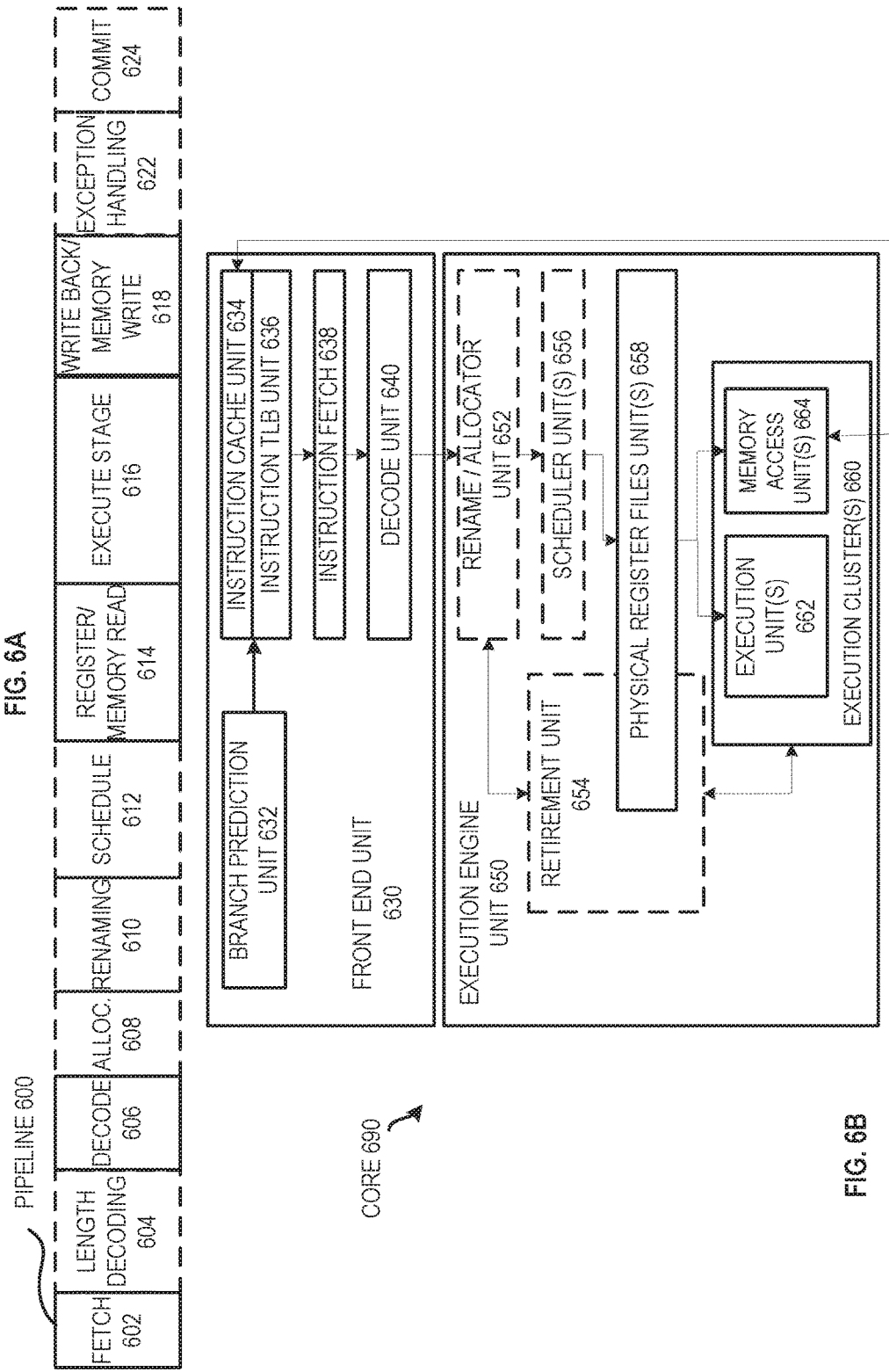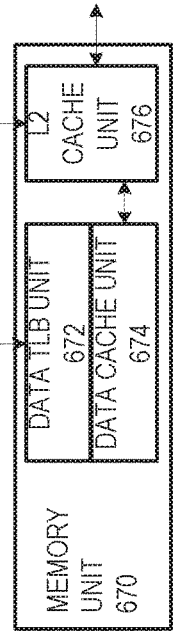

READ FROM MEMORY INSTRUCTIONS, PROCESSORS, METHODS, AND SYSTEMS, THAT DO NOT TAKE EXCEPTION ON DEFECTIVE DATA

CROSS-REFERENCE TO RELATED APPLICATION

This application is a continuation of U.S. patent application Ser. No. 15/201,438, filed on Jul. 2, 2016, entitled READ FROM MEMORY INSTRUCTIONS, PROCESSORS, METHODS, AND SYSTEMS, THAT DO NOT TAKE EXCEPTION ON DEFECTIVE DATA which is hereby incorporated herein by reference in its entirety and for all purposes.

BACKGROUND

Technical Field

Embodiments described herein generally relate to processors. In particular, embodiments described herein generally relate to loading data from memory with processors.

Background Information

Various different types of computer systems and/or other data processing systems typically include at least one processor and a system memory. The memory may be used to store various different types of software and associated data.

During operation, the processor may perform instructions to load or otherwise read the data from the memory. Once loaded, the data may be arithmetically, logically, or otherwise processed by the processor. Eventually, the processed data may be stored back to the memory.

BRIEF DESCRIPTION OF THE DRAWINGS

The invention may best be understood by referring to the following description and accompanying drawings that are used to illustrate embodiments. In the drawings:

FIG. 6A is a block diagram illustrating an embodiment of an in-order pipeline and an embodiment of a register renaming out-of-order issue/execution pipeline.

FIG. 6B is a block diagram of an embodiment of processor core including a front end unit coupled to an execution engine unit and both coupled to a memory unit.

DETAILED DESCRIPTION OF EMBODIMENTS

Figure 1:
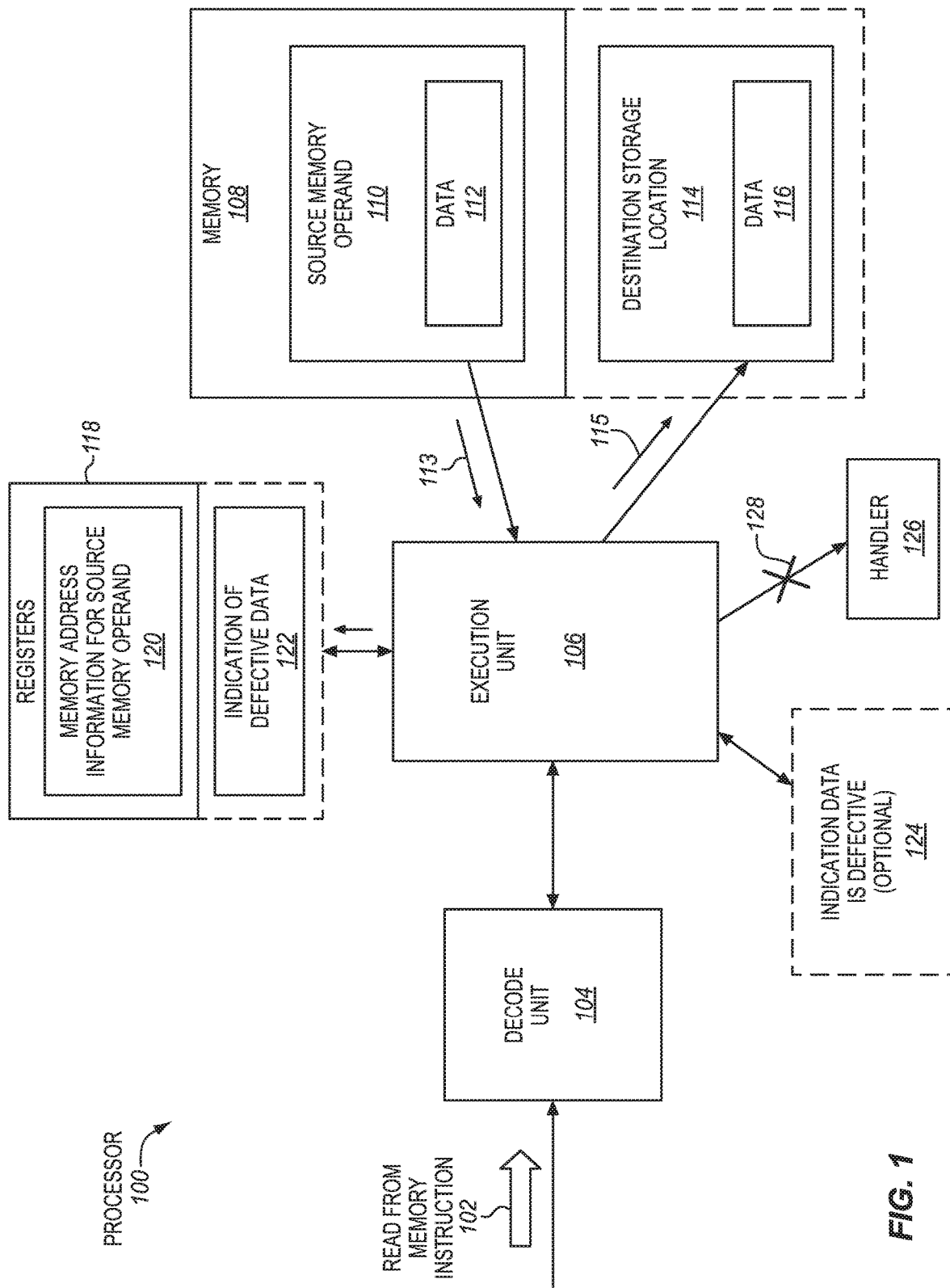
FIG. 1 is a block diagram of an embodiment of a processor that is operative to perform an embodiment of a read from memory instruction.

Disclosed herein are embodiments of read from memory instructions, embodiments of processors to perform the instructions, embodiments of methods performed by the processors when performing the instructions, embodiments of systems incorporating one or more processors to perform the instructions, and embodiments of programs or machine-readable mediums providing the instructions. In some embodiments, the processors may have a decode unit or other logic to receive and/or decode the read from memory instruction, and an execution unit or other logic to perform the read from memory instruction. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

One challenge is that data, either while in memory, or on its way to the processor when being read, or within the processor, or when being stored back to the memory, may sometimes become defective. For example, the data may become corrupted, flawed, faulty, erroneous, or otherwise defective. As one specific example, the data may be defective when, for whatever reason, there is a data parity error in which the data is inconsistent with an associated set of parity data. As another specific example, the data may be defective when, for whatever reason, there is an error correction code (ECC) error in which the data has an error that associated error correction code data is not able to correct. As yet another specific example, the data may be defective when there is an unintentional flipping of one or more bits in one or more memory cells of the memory and/or within one or more storage devices of the processor, such as, for example, due to cosmic radiation, or some other reason. As another specific example, the data may be defective when, for whatever reason, a poison detection indicator is associated with the data (e.g., by logic of the processor, other system hardware components, etc.). These are just a few illustrative examples of possible causes of defective data.

Generally, such defective data should not be used for further processing or calculations. Consequently, when performing any of various different types of read from memory instructions, the detection of such defective data will generally raise or cause a Machine Check Exception (MCE), or similar serious exception or error. Defective data is one possible cause of such a MCE which may be generated by the processor when it detects a hardware error or problem, such as, for example, an uncorrected defective data. MCEs typically represent serious exceptions or errors, such as, for example, abort class exceptions, fatal exceptions, fatal errors, or the like. Certain types of MCEs may be recoverable or correctable under certain situations, for example, for certain types of errors and if the processor has architectural support to perform such recovery or correction. For example, this may be the case for a class of architectural errors from which system software can attempt recovery known as Uncorrected Recoverable (UCR) Errors. Such errors may represent uncorrected errors that have been detected, but have not corrupted the processor context. For certain such types of errors, once system software has performed a certain recovery action, it may be possible to continue execution on the processor. The machine check handler may use information about the error (e.g., in MSRs or elsewhere) to try to correct the problem. However, other types of MCEs may not be recoverable or correctable. In cases where the MCEs cannot be recovered or corrected, a restart of the processor and/or the system may be needed, before normal operation is able to resume.

The need to restart the processor and/or the system for at least some of such MCEs or other such serious exceptions or errors generally tends to reduce performance. In addition, in some embodiments, as described further below, system memory may be used in block storage modes and/or for block style usages like those traditionally used in the storage market. Using system address space to address block storage regions may tend to offer efficiencies and improved performance as compared to conventional block style semantics used for block devices. However, block mode may involve different error handling that is different than the error handling when errors occur in the system address space. For example, errors encountered during block operations may be reported in a status register, and a block driver may handle errors reported through the status register. Embodiments described herein may help to allow block regions to be addressed in the system address space, but may allow the processor to indicate errors in the block region without taking a machine check exception or the like, which would generally happen when such block regions are addressed with conventional block storage semantics. Alternate approaches for handling such MCES or other serious exceptions or errors that do not require restarting the processor and/or the system may be useful and beneficial.

FIG. 1 is a block diagram of an embodiment of a processor 100 that is operative to perform an embodiment of a read from memory instruction 102. In the illustration a memory 108 is coupled with the processor, although other embodiments pertain to the processor alone without the memory (e.g., the processor before deployed in a system having the memory). The memory may include one or more memory devices of one or more types (e.g., dynamic random access memory (DRAM), flash memory, hard disks, dual in-line memory modules (DIMMs), and the like, and various combinations thereof).

In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures). In some embodiments, the processor may include be disposed on at least one integrated circuit or semiconductor die. In some embodiments, the processor may include at least some hardware (e.g., transistors, capacitors, diodes, circuitry, non-volatile memory storing microcode, or the like).

During operation, the processor 100 may receive the read from memory instruction 102. In various aspects, the instruction may be received from an off-processor and/or off-die source (e.g., from off-die memory or a bus or other interconnect), or from an on-processor and/or on-die source (e.g., from an instruction cache, instruction queue, or an on-die memory). The read from memory instruction may represent a macroinstruction, machine code instruction, or other instruction or control signal of an instruction set of the processor.

In some embodiments, the read from memory instruction may explicitly specify (e.g., through one or more fields or a set of bits), or otherwise indicate (e.g., implicitly indicate), a source memory operand 110 in the memory 108. The source memory operand may be indicated in different ways in different embodiments. In some embodiments, the instruction may identify a pointer or other memory address information 120 to identify (potentially with other information depending upon the addressing mode) the source memory operand. As shown, the memory address information may optionally be stored in a set of registers 118 (e.g., scalar registers, general-purpose registers, etc.) of the processor. For example, the instruction may explicitly specify (e.g., through one or more fields or a set of bits), or otherwise indicate (e.g., implicitly indicate), a source register in the set of registers storing the memory address information. As one example, the instruction may have a source operand specification field to explicitly specify such a source register. Alternatively, such a source register may optionally be implicit to the instruction (e.g., implicit to an opcode of the instruction). For example, the processor may implicitly or inherently understand to look in this implicit source register when it recognizes this instruction (e.g., when it decodes the opcode), without the instruction needing to have any non-opcode bits to explicitly specify the source register. Depending upon the particular addressing mode, the memory address information 120 may optionally be combined with other memory address information in order to address the source memory operand. Such additional memory address information may be in another register (e.g., a data segment register, extended segment register, or other memory address register), in the encoding of the instruction, or elsewhere. By way of example, with segmented addressing, a program may have multiple independent address spaces known as segments. A byte address may be specified as a combination of the address information from a segment register and further address information (e.g., a byte address) from a general-purpose register (e.g., segment-register:byte-address). For example, the address DS:FF79H may be used to address the byte at address FF79H in the segment pointed by the DS segment register.

Each of the registers 118 may represent an on-die (or on integrated circuit) storage location that is operative to store data. The registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof.

In some embodiments, the read from memory instruction may also explicitly specify (e.g., through one or more fields or a set of bits), or otherwise indicate (e.g., implicitly indicate), a destination storage location 114. As shown, in some embodiments, the destination storage location may optionally be another location in the memory. In such embodiments, the same approaches as those described above for the source memory operand are suitable to identify the destination memory operand. Alternatively, the destination storage location may optionally be one or more registers of the processor (e.g., one or more general-purpose registers, one or more packed data registers, etc.), or another storage location. Such registers or other storage locations may be specified or implicit.

Referring again to FIG. 1, the processor includes a decode unit or decoder 104. The decode unit may receive and decode the read from memory instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level read from memory instruction. In some embodiments, the decode unit may include one or more input structures (e.g., port(s), interconnect(s), an interface) to receive the read from memory instruction, an instruction recognition and decode logic coupled therewith to recognize and decode the read from memory instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units. In some embodiments, the decode unit may be included on a die (e.g., on die with the execution unit 106). In some embodiments, the decode unit may include at least some hardware (e.g., transistors, integrated circuitry, or on-die firmware, etc.).

In some embodiments, instead of the read from memory instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the read from memory instruction, which may be of a first instruction set, and may emulate, translate, morph, interpret, or otherwise convert the read from memory instruction into one or more corresponding intermediate instructions or control signals, which may be of a second different instruction set. The one or more intermediate instructions or control signals of the second instruction set may be provided to a decode unit (e.g., decode unit 104), which may decode them into one or more lower-level instructions or control signals executable by native hardware of the processor (e.g., one or more execution units).

Referring again to FIG. 1, the execution unit 106 is coupled with the decode unit 104 and the registers 118. In some embodiments, the execution unit may be on a die or integrated circuit (e.g., with the decode unit). The execution unit may receive the one or more decoded or otherwise converted instructions or control signals that represent and/or are derived from the read from memory instruction. During deployment and use, the execution unit may also be operative to be coupled with the memory and/or the source memory operand. In some embodiments, the execution unit may be operative, in response to and/or as a result of the read from memory instruction (e.g., in response to one or more instructions or control signals decoded from the instruction and/or in response to the instruction being decoded and/or in response to the instruction being provided to a decoder), to read data 112 from the source memory operand 110. This is generally shown at first arrow 113. If cases where the data is not defective, the execution unit may further be operative to store the data 116 to the destination storage location 114. This is generally shown at second arrow 115.

However, in some cases, the data may be defective. For example, the data may be defective in the various different ways described above. In some embodiments, the processor may have logic and/or mechanisms and/or otherwise be operative to detect or identify such defective data. For example, in some embodiments, the execution unit and/or the processor may be operable to and/or may have logic to inspect, observe, or access, an optional indication 124 (e.g., which may optionally be micro-architectural, although this is not required) that the data is defective. One suitable example of such an indication is a poison indication (e.g., one or more bits with a particular value understood to be a poison indication) that is logically tied to or otherwise associated with the data. Such a poison indication, for example, may be provided as part of a read-response transaction. Other suitable examples of such indications are signals from caches, register files, or other on-die storage locations or logic indicating parity errors, error correction code errors, or other such indications of defective data by any of various different possible types of defective data detection logic of the processor.

In some embodiments, when the data is defective, the execution unit may be operative, in response to and/or as a result of the read from memory instruction, to store an indication of defective data 122 in an architecturally visible storage location. As shown, in some embodiments, the architecturally visible storage location may optionally be a register of set of registers 118 of the processor. For example, a general-purpose register, a scalar register, or the like, may be used. By way of example, a given value that is understood by the processor and/or software to indicate defective data (e.g., a value of negative one as possible example), may be stored in such a register when the data is defective, and any other different value may be stored in the register when the data is not defective. Alternatively, the architecturally visible storage location may be one or more condition code bits, such as, for example, one or more flags, bits in a flag register, status bits, bits in a status register, or other condition code bits. By way of example, a given condition code bit may have a first value (e.g., set to binary one according to one possible convention) to indicate that the data is defective, or may have a second different value (e.g., cleared to binary zero) to indicate that the data is not defective. Conventionally, it would be typical to cause the exceptional condition when the data is defective. For example, the read from memory may be included in an instruction set with one or more other read from memory instructions that have existed in the instruction set longer, which would cause (e.g., unconditionally cause) an exceptional condition when defective data is read.

In some embodiments, the execution unit may further be operative, in response to and/or as a result of the read from memory instruction, when the data is defective, to complete execution of the read from memory instruction without raising, firing, or otherwise causing an exception, machine check exception, abort, other fatal or at least severe exception or error, or other exceptional condition 128. This is shown in the illustration by an "X" through the exceptional condition 128 which would otherwise signal or alert a handler 126. For example, in some embodiments, the read from memory may be retired or otherwise committed without causing such an exceptional condition 128. In some embodiments, the read from memory instruction may complete without causing a transfer to a MCE handler, an exception handler, another severe exception or error handler, an operating system handler, or other such handler 126. Rather, in some embodiments, the read from memory instruction may instead store the indication of the defective data 122 in the architecturally visible storage location, and then retire or otherwise commit. In some embodiments, this may be the case even when the data is defective in a way in which the instruction set architecture before the read from memory instruction was introduced would have caused an unrecoverable MCE.

Advantageously, the read from memory instruction may be operable to cause the execution unit and/or the processor to signal defective data by storing the indication of the defective data in an architecturally visible storage location without causing a severe exception or error. Without limitation, this may allow, at least in some cases and/or under some circumstances, the processor and/or software to observe the indication of the defective data 122 and attempt to replace and/or fix the defective data without causing the exceptional condition. For example, in a case where another non-defective copy of the data exists, such as, for example, may be the case in various forms of RAID (redundant array of independent disks) and/or other techniques based on data redundancy, privileged system software may be able to observe the indication of the defective data 122, and replace the defective data with another redundant copy of the data which is non-defective data. In other cases, logic of the processor and/or software may potentially be able to fix the defective data (e.g., by applying additional error correction measures or the like). This may help to avoid at least some such exceptional conditions and/or at least some restarts of the processor and/or the system.

The execution unit and/or the processor may include specific or particular logic (e.g., transistors, integrated circuitry, or other hardware potentially combined with firmware (e.g., instructions stored in non-volatile memory) and/or software) that is operative to perform the read from memory instruction. As used herein, the term "execution unit" does not imply and is not limited to a single discrete unit performing all of the aforementioned possible operations. Rather, such operations may potentially be performed by separate or distributed logic that is distributed throughout two or more units or components within a memory subsystem (e.g., a memory unit a memory access unit). As one example, the execution unit may include a combined load/store execution unit to load data from a source and store it to a destination. As another example, the execution unit may include a load unit to load data from a source, and a separate store unit to store the data to a destination, as well as possibly other components/units. For simplicity, and to conform with common usage of the term execution unit to refer to the component that actually executes or performs an instruction, such logic is referred to herein as an execution unit. It may also be stated herein that a memory subsystem and/or a memory unit and/or a memory access unit and/or memory access logic of the processor and/or a memory interface unit or logic of the processor, may be operative to perform the read from memory instruction as disclosed herein.

To avoid obscuring the description, a relatively simple processor 100 has been shown and described. However, the processor may optionally include other processor components. For example, various different embodiments may include various different combinations and configurations of the components shown and described for any of FIGS. 6-8. All of the components of the processor may be coupled together to allow them to operate as intended. By way of example, considering FIG. 6B, the instruction cache 6 may cache the instructions, the instruction fetch unit 638 may fetch the instruction, the decode unit 640 may decode the instruction, the scheduler unit 656 may schedule the associated operations, the execution unit 662 may perform the instruction, the retirement unit 654 may retire the instruction, etc.

Figure 2:
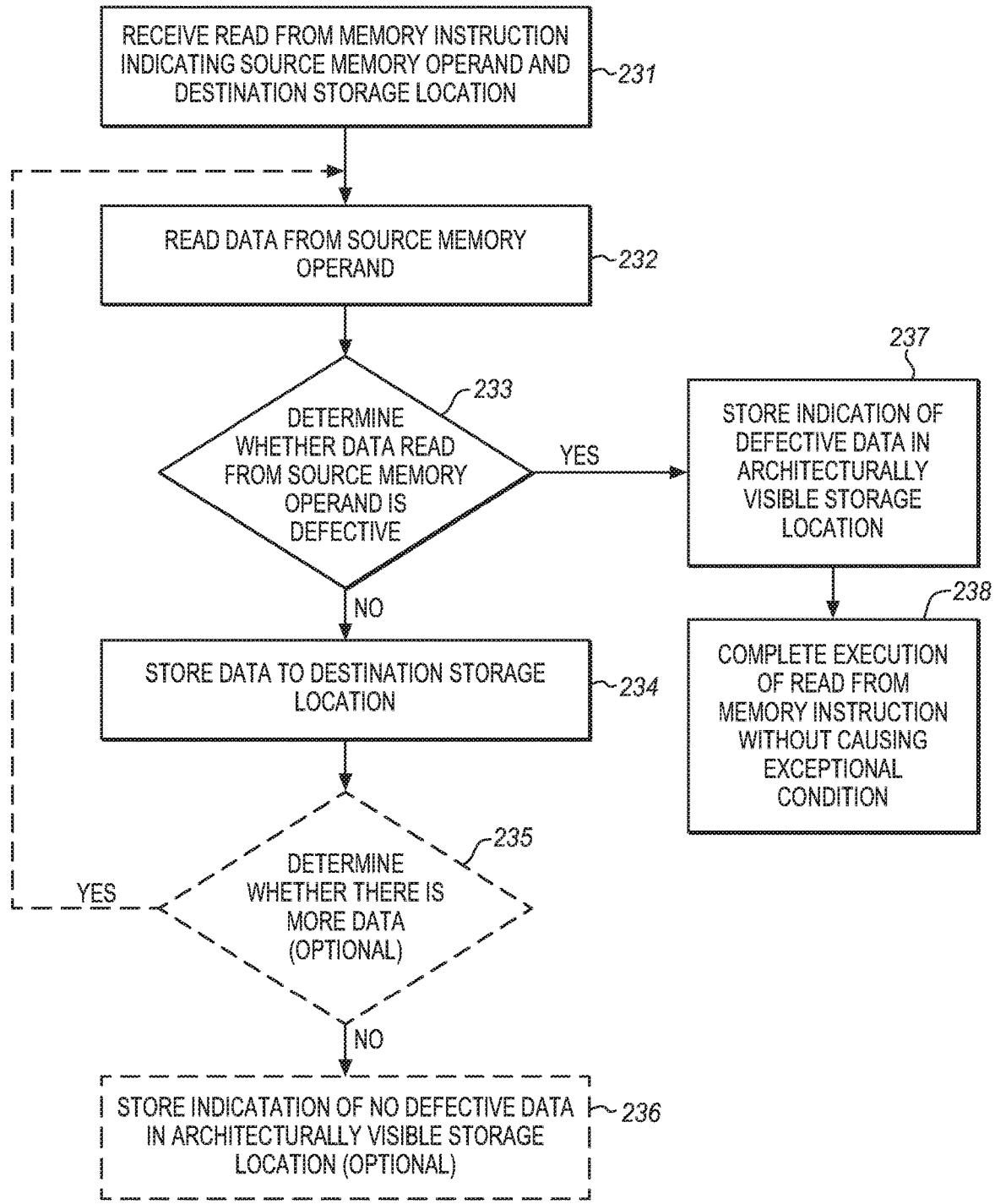
FIG. 2 is a block flow diagram of an embodiment of a method of performing an embodiment of a read from memory instruction.

FIG. 2 is a block flow diagram of an embodiment of a method 230 of performing an embodiment of a read from memory instruction. In various embodiments, the method may be performed by a processor, instruction processing apparatus, digital logic device, or integrated circuit. In some embodiments, the method 230 may be performed by and/or with the processor 100 of FIG. 1 and/or using the instruction 102 of FIG. 1. The components, features, and specific optional details described herein for the processor 100 and/or the instruction 102, also optionally apply to the method 230. Alternatively, the method 230 may be performed by and/or within a similar or different processor or apparatus and/or using a similar or different instruction. Moreover, the processor 100 may perform methods the same as, similar to, or different than the method 230.

The method 230 includes receiving the read from memory instruction, at block 231. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). In some embodiments, the read from memory instruction may specify (e.g., explicitly specify) or otherwise indicate (e.g., implicitly indicate) a source memory operand, and a destination storage location.

At block 232, data may be loaded or otherwise read from the source memory operand, in response to and/or as a result of the read from memory instruction. In some cases, the read data may be defective. In other cases, the read data may not be defective.

At block 233, a determination may be made whether the data read from the source memory operand is defective. By way of example, this may include checking for an indication that the data is defective. The previously described types of indications are suitable (e.g., poison indications, parity error indications, error correction code (ECC) error indications, etc.).

If the determination at block 233 is that the data is not defective (i.e., "no" is the determination), the method may advance to block 234. At block 234, the read data may be stored to the destination storage location. The method may then advance to optional block 235.

At optional block 235, in some embodiments, a determination may optionally be made whether there is more data, although this is not required. This determination may exist for certain types of read from memory instructions (e.g., repeat memory move or copy instructions, gather instructions, instructions that read different portions of data from memory sequentially, and the like), but may not exist or be omitted entirely for other types of read from memory instructions (e.g., instructions that read data from memory into a single register, instructions that read only one piece of data at one time and then end, etc.). If the optional determination at block 235 is that there is more data to be read (i.e., "yes" is the determination), the method may revisit block 232 where additional data may be read. Then, the additional data may again be inspected for defective data at block 233, and so on.

Alternatively, if the determination at block 235 is that there is not more data to be read (i.e., "no" is the determination), the method may advance to optional block 236. In cases where block 235 is optionally omitted (e.g., for certain types of read from memory instructions as discussed above), the method may also advance directly from block 234 to optional block 236. At optional block 236, once all data has been read from memory, and stored to the destination storage location, and in cases where none of the data was determined to be defective at block 233, in some embodiments, an indication of no defective data may optionally be stored in an architecturally visible storage location. In some embodiments, the architecturally visible storage location may be a register (e.g., a general-purpose register). In other embodiments, the architecturally visible storage location may be one or more condition code bits. The read from memory instruction may then complete and retire or otherwise commit.

Referring again to block 233, if instead the determination at block 233 were that the data is defective (i.e., "yes" is the determination), the method may advance from block 233 to block 237. At block 237, in some embodiments, an indication of defective data may be stored in an architecturally visible storage location. This may be done as previously described. In some embodiments, the architecturally visible storage location may be a register (e.g., a general-purpose register). In other embodiments, the architecturally visible storage location may be one or more condition code bits. The method may then advance to block 238.

At block 238, execution of the read from memory instruction may complete without causing an exceptional condition, even after some of the data was determined to be defective. In some embodiments, there may be no forced transfer to a handler. Rather, read from memory instruction may be allowed to complete, and optionally retire or otherwise commit, and then the next instruction after the read from memory instruction (e.g., the next sequential instruction) may be performed.

Without limitation, the processor and/or privileged system software may optionally/potentially access the indication of the defective data stored at block 237, and attempt to fix the defective data so that it is no longer defective and/or replace the defective data with data that is not defective (e.g., a non-defective copy of the data).

Various different subsets of the operations shown by blocks 232 through 238 may be performed in response to and/or as a result of the read from memory instruction depending upon whether or not data is defective, the particular type of read from memory instruction (e.g., whether multiple data portions are read sequentially, etc.). By way of example, a first instance of the read from memory instruction may perform only blocks 231, 232, 233, 237, and 238. As another example, a second instance of the read from memory instruction may perform only blocks 231, 232, 233, 234, 235, and 236. Still other instances may revisit and loop through blocks 232, 233, and 234 one or more times, before eventually performing either blocks 237 and 238 or block 236.

Figure 3:
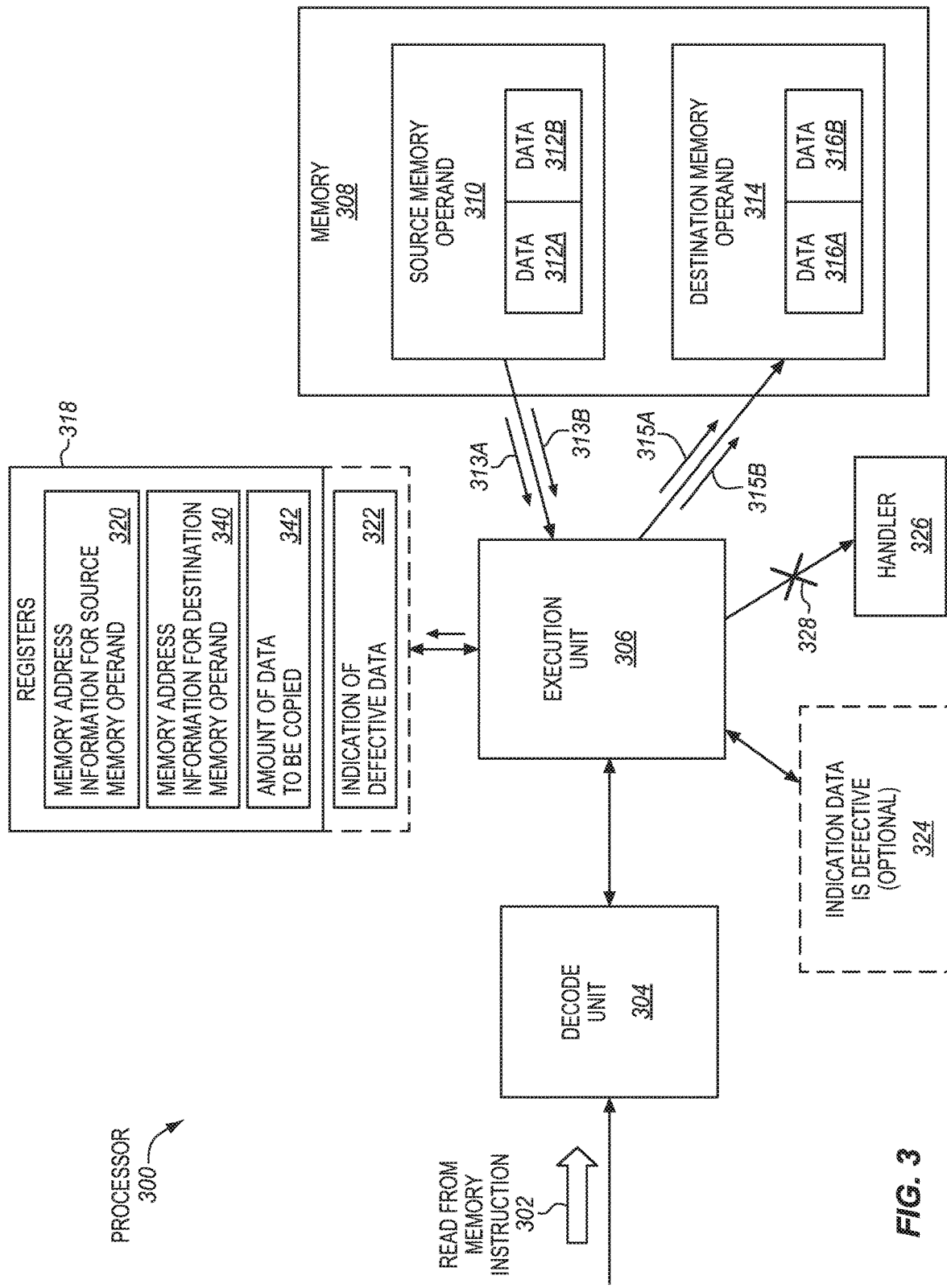
FIG. 3 is a block diagram of an embodiment of a processor that is operative to perform an embodiment of read from memory instruction.

FIG. 3 is a block diagram of an embodiment of a processor 300 that is operative to perform an embodiment of read from memory instruction 302. The processor 300 may be the same as, similar to, or different than, the processor 100 of FIG. 1. The processor includes a decode unit 304 that is operative to decode the read from memory instruction 302, an execution unit 306 that is operative to execute or perform the read from memory instruction, and registers 318 operative to store operands 320. 340, 342, 322 associated with the read from memory instruction. These components may optionally be the same as or similar to (e.g., have any one or more characteristics that are the same or similar to) the correspondingly named components of FIG. 1. To avoid obscuring the description, the different and/or additional characteristics of the embodiment of FIG. 3 will primarily be described, without repeating all the characteristics which may optionally be the same or similar to those described for the embodiment of FIG. 1.

During operation, the processor 300 may receive the read from memory instruction 302. In various aspects, the instruction may be received from an off-processor and/or off-die source, or from an on-processor and/or on-die source. The read from memory instruction may represent a macroinstruction, machine code instruction, or other instruction or control signal of an instruction set of the processor. In some embodiments, the read from memory instruction may be a read from memory and store to memory instruction. For example, the instruction may be a memory copy instruction to copy data from one location in memory to another, or a memory move instruction to move data from one location in memory to another.

In some embodiments, the read from memory instruction may explicitly specify (e.g., through one or more fields or a set of bits), or otherwise indicate (e.g., implicitly indicate), each of a source memory operand 310 (e.g., a starting location) in a memory 308, a destination memory operand 314 (e.g., a starting location) in the memory. By way of example, the instruction may indicate the starting points or lowest-addressed portions of the source and destination operands. The source and destination operands may also be regarded and referred to simply as a source and destination of the instruction. The source and destination memory operands may be indicated in the various different ways previously described for the source memory operand of FIG. 1. For example, as shown, memory address information 320 to address the start of the source memory operand 310, and memory address information 340 to address the start of the source memory operand 314, may each optionally be stored in a different register of a set of registers 318 (e.g., general-purpose registers) of the processor.

In some embodiments, the read from memory instruction may also explicitly specify (e.g., through one or more fields or a set of bits), or otherwise indicate (e.g., implicitly indicate), an amount of data 342 to be copied, moved, or otherwise stored from the source memory operand 310 to the destination memory operand 314. The amount of data to be copied may be expressed in different ways in different embodiments. By way of example, in various embodiments, the amount of data may be expressed as a number of bits, bytes, words, doublewords, quadwords, or data elements to be copied, or as a length of the source operand in bits, bytes, words, doublewords, quadwords, or data elements, or as a size of a string to be copied, or as an address, pointer, offset, or other indication of an end or highest-addressed portion of the source or destination operand. As shown, in some embodiments, the instruction may specify or otherwise indicate a register in the set of registers 318 to store the amount of data 342. Alternatively, the amount of data may be stored in a memory location or other storage location. As yet another option, the amount of data to be copied may optionally be specified or indicated in a field or other portion of the instruction itself (e.g., in an immediate field).

Referring again to FIG. 3, the processor includes the decode unit or decoder 304. The decode unit may be operative to decode the read from memory instruction 302. The execution unit 306 is coupled with the decode unit 304 and the registers 318. In some embodiments, the execution unit may be operative, in response to and/or as a result of the read from memory instruction (e.g., in response to one or more instructions or control signals decoded from the instruction and/or in response to the instruction being decoded and/or in response to the instruction being provided to a decoder), to sequentially load, read, or otherwise receive different discrete portions of data 312A, 312B from sequential or contiguous data storage locations of the source memory operand 310. For example, a first data portion 312A may be read as shown by a first arrow 313A, and then a second data portion 312B may be read as shown by a second arrow 313B, and so on. The execution unit may further be operative, in response to and/or as a result of the read from memory instruction, to separately and/or sequentially copy, move, write, or otherwise store data portions 316A, 316B to sequential and/or contiguous data storage locations of the destination memory operand 314. For example, a first data portion 316A may be stored as shown by a first arrow 315A, and then a second data portion 316B may be stored as shown by a second arrow 315B, and so on. The data portions may either be stored back without modification, or modifications to the data could have been made beforehand. The portions may have different data size granularities in different embodiments, such as, for example, byte, word, doubleword, or quadword sizes. Such separate and/or separate sequential read and store operations may be repeated multiple times, potentially many times, until the entire amount of data (e.g., as indicated by the amount of data 342 to be copied) has been transferred from the source memory operand to the destination memory operand. In one aspect, the instruction may optionally have a repeat prefix, although the scope of the invention is not so limited.

The operations described in the immediately previous paragraph may be performed in cases where the data read or stored is not defective. However, in some embodiments, some of the data may potentially be defective. For example, the data may be defective in the various different ways described above. In some embodiments, the execution unit and/or the processor may have logic and/or mechanisms and/or otherwise be operative to determine when data is defective. For example, in some embodiments, the execution unit and/or the processor may be operable to and/or may have logic to inspect, observe, or access, an optional indication 324 (e.g., possibly a micro-architectural indication, although this is not required) that the data is defective. One suitable example of such an indication is a poison indication (e.g., one or more bits with a particular value understood to be a poison indication) that is logically tied to or otherwise associated with the data. Such a poison indication, for example, may be provided as part of a read-response transaction. Other suitable examples of such indications are signals from caches, register files, or other on-die storage locations or logic indicating parity errors, error correction code errors, or other such indications of defective data by any of various different possible types of defective data detection logic of the processor.

In some embodiments, when the data is defective, the execution unit may be operative, in response to and/or as a result of the read from memory instruction, to store an indication of defective data 322 in an architecturally visible storage location. As shown, in some embodiments, the architecturally visible storage location may optionally be a register of set of registers 318 of the processor. By way of example, a given value that is understood by the processor and/or software to indicate defective data (e.g., a value of negative one as possible example), may be stored in such a register when the data is defective, and any other different value may be stored in the register when the data is not defective. Alternatively, the architecturally visible storage location may be one or more condition code bits, such as, for example, one or more flags, bits in a flag register, status bits, bits in a status register, or other condition code bits. By way of example, a given condition code bit may have a first value (e.g., set to binary one according to one possible convention) to indicate that the data is defective, or may have a second different value (e.g., cleared to binary zero) to indicate that the data is not defective.

In some embodiments, the execution unit may further be operative, in response to and/or as a result of the read from memory instruction, when the data is defective, to complete execution of the read from memory instruction without raising, firing, or otherwise causing an exception, machine check exception, abort, other fatal or at least severe exception or error, or other exceptional condition 328. This is shown in the illustration by an "X" through the exceptional condition 328 which would otherwise signal or alert a handler 326. For example, in some embodiments, the read from memory may be retired or otherwise committed without causing such an exceptional condition. In some embodiments, the read from memory instruction may complete without causing a transfer to a MCE handler, an exception handler, another severe exception or error handler, an operating system handler, or other such handler 326. Rather, in some embodiments, the read from memory instruction may instead store the indication of the defective data 322 in the architecturally visible storage location, and then retire or otherwise commit. In some embodiments, this may be the case even when the data is defective in a way in which the instruction set architecture before the read from memory instruction was introduced would have caused an unrecoverable MCE.

In some embodiments, the execution unit may further be operative, in response to and/or as a result of the read from memory instruction, when it completes before the entire amount of data 342 has been transferred, to store an updated amount of data (e.g., overwriting the amount of data 342). In some embodiments, software may use this updated amount of data to help identify the precise location of the data that is defective. Also, this updated amount of data may possibly be used if the read from memory instruction is restarted or resumed to start again where it left off.

In some embodiments, different portions of the system memory of a computer system or other electronic device may be used in different ways. For example, there may be different modes where a portion of the memory may be used in different ways. For example, in one mode, a portion of memory may be used to extend system memory where DRAM or other memory normally used for primary memory is used roughly analogously to a fourth level cache. In another mode, the portion of memory may be used as persistent memory to retain contents even when there is a power failure. The persistent memory may either represent natively non-volatile memory, or battery backed volatile memory, or a combination. In yet another mode, the portion of memory may be used as block storage memory such as that traditionally used in the storage market.

Conventionally, block storage memory regions are typically not addressable from the system address space. Instead, the block region may be managed by a block driver, or the like. However, in some embodiments, the read from memory instructions as disclosed herein may be operative to address block storage memory locations in the block storage memory within the system address space (e.g., the physical memory of the system that instructions of the instruction set can address). This may be true, even when the processor is a general-purpose processor, such as a general-purpose central processing unit (CPU). This may allow software to address block regions as a system address space. Using the system address space may help to improve efficiency and/or performance as compared to the conventional block style semantics typically used for block devices.

Figure 4:
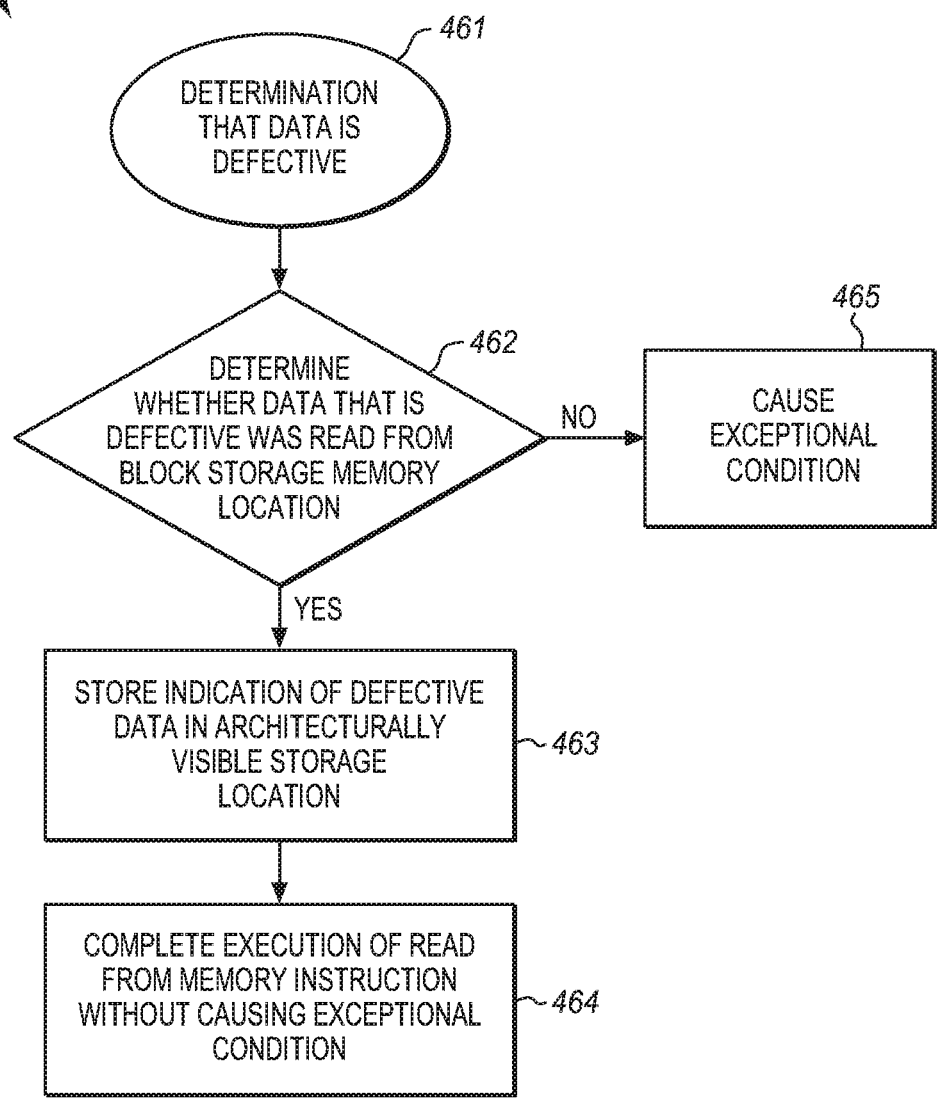
FIG. 4 is a block flow diagram of an embodiment of a method of handling defective data that is suitable for an embodiment of a read from memory instruction.

In some embodiments, it may be useful or beneficial to handle or treat defective data from block storage memory locations differently than for non-block storage memory locations (e.g., DRAM or other primary storage). FIG. 4 is a block flow diagram of an embodiment of a method 460 of handling defective data that is suitable for an embodiment of a read from memory instruction. In various embodiments, the method may be performed by a processor, instruction processing apparatus, digital logic device, or integrated circuit. In some embodiments, the method 460 may be performed by and/or with the processor 100 of FIG. 1 and/or during performance of the instruction 102 of FIG. 1. In some embodiments, the method 460 may be performed by and/or with the processor 300 of FIG. 1 and/or during performance of the instruction 302 of FIG. 1. The components, features, and specific optional details described herein for the processor 100 and/or the processor 300, and for the instruction 102 and/or the instruction 302, also optionally apply to the method 460. Alternatively, the method 460 may be performed by and/or within a similar or different processor or apparatus and/or during performance of a similar or different instruction. Moreover, the processors 100 and/or 300 may perform methods the same as, similar to, or different than the method 460.

The method 460 represents a portion of the operations of a read from memory instruction after a determination 461 has been made that data is defective. For example, this determination may be made as previously described above in conjunction with block 233 of FIG. 2.

The method may advance from such a determination 461 to block 462. At block 462, in some embodiments, a determination may be made whether the data that is defective was read from a block storage memory location. By way of example, the execution unit and/or the processor may be operative to make this determination by examining one or more model-specific registers (MSRs) that are used to indicate ranges of block storage memory to determine if a memory location from where the data was obtained corresponds to one of these ranges used for block storage. As another example, the execution unit may be operative to make this determination by examining a read-response (e.g., an extended response code thereof) associated with the read of the data which may indicate whether a memory location from where the data was obtained corresponds to block storage.

If the determination at block 462 is that the data that is defective was read from the block storage memory location (i.e., "yes" is the determination), the method may advance to block 463. At block 463, in some embodiments, an indication of defective data may be stored in an architecturally visible storage location. Then, at block 464, execution of the read from memory instruction may complete without causing an exceptional condition, even after some of the data was determined to be defective. In some embodiments, there may be no forced transfer to a handler. Rather, read from memory instruction may be allowed to complete, and optionally retire or otherwise commit. In some embodiments, the operations at blocks 463 and 464 may be performed as previously described (e.g., in conjunction with FIG. 1 and/or FIG. 3). Without limitation, the processor and/or privileged system software may optionally/potentially access the indication of the defective data stored at block 463, and attempt to fix the defective data so that it is no longer defective and/or replace the defective data with data that is not defective (e.g., a non-defective copy of the data). At least in some cases, this may help to avoid a need to restart the processor and/or the system.

Alternatively, if the determination at block 462 was that the data that is defective was not read from the block storage memory location (i.e., "no" is the determination), the method may advance to block 465. At block 465, in some embodiments, the read from memory instruction may fire, raise, or otherwise cause an exceptional condition. In some embodiments, the exceptional condition may be a machine-check exception, or other such serious, fatal, or abort class exception or error. In some embodiments, this may force a transfer to a handler of any of the previously described types (e.g., a machine-check exception handler). Then, the read from memory instruction may be allowed to complete, and optionally retire or otherwise commit.

Various different subsets of the operations shown by blocks 461 through 465 may be performed in response to and/or as a result of the read from memory instruction depending upon whether or data that is defective was read from the block storage memory location. By way of example, a first instance of the read from memory instruction may perform only blocks 461, 462, and 465. As another example, a second instance of the read from memory instruction may perform only blocks 461, 462, 463, and 464.

Advantageously, this method may allow a processor to autonomously determine whether to cause an exception and forced transfer to a handler, or to instead store an indication of defective data in an architectural storage location (e.g., and allow the processor and/or software try to correct the defective data) based on and/or dependent on a type of memory region from where the defective data was read. Specifically, this may allow handling data from block storage memory locations to be handled differently than data from regular memory locations (e.g., DRAM and other primary storage).

Figure 5:
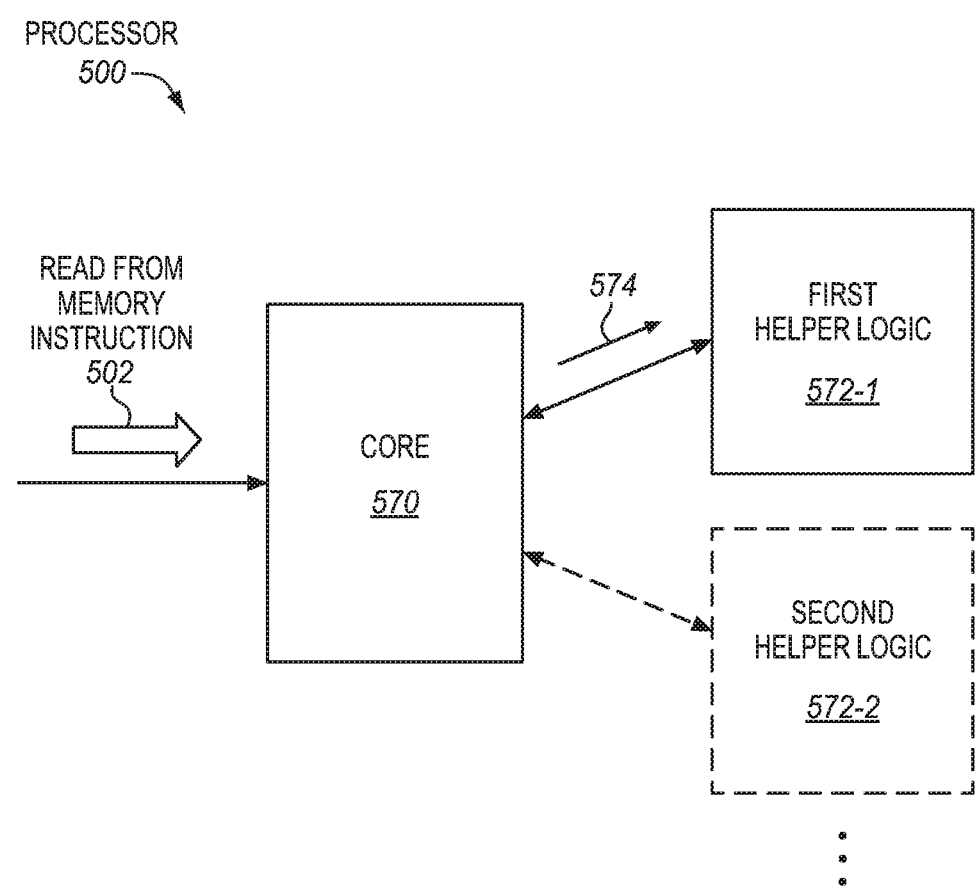
FIG. 5 is a block diagram of an example embodiment of a processor having a core, and one or more sets of helper logic, which is suitable for embodiments.

FIG. 5 is a block diagram of an example embodiment of a processor 500 having a core 570, and one or more sets of helper logic 572, which is suitable for embodiments. In the illustrated example, there is a first helper logic 572-1, optionally a second helper logic 572-2, and optionally others. In some embodiments, a read from memory instruction 502 may be provided to the core 570. For example, the read from memory instruction may represent one that is used to read multiple, or in some cases potentially many, sequential portions of data (e.g., the instruction 302 of FIG. 3). In some embodiments, instead of the core performing the entire read from memory instruction, the core may instead assign at least a first read from memory operation 574 to at least one of the sets of helper logic. For example, in some embodiments, the core may split an amount of data to be transferred into two or more non-overlapping portions, and assign these respective portions to two or more sets of helper logic. Examples of suitable helper logic includes, but is not limited to, a helper core, an accelerator, an offload engine, and the like. The helper logic may then perform the read from memory operations, which may help to offload this task from the core. This may help to allow the core to perform other tasks. Also, the two or more sets of helper logic may be able to perform the transfers in parallel or concurrently, which may help to improve performance. In some cases, this may also help to reduce power. For example, the core may have a higher power consumption than each of the sets of helper logic (e.g., the helper logic may have less power consuming logic or features, be in-order instead of out-of-order, etc.).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 7B:
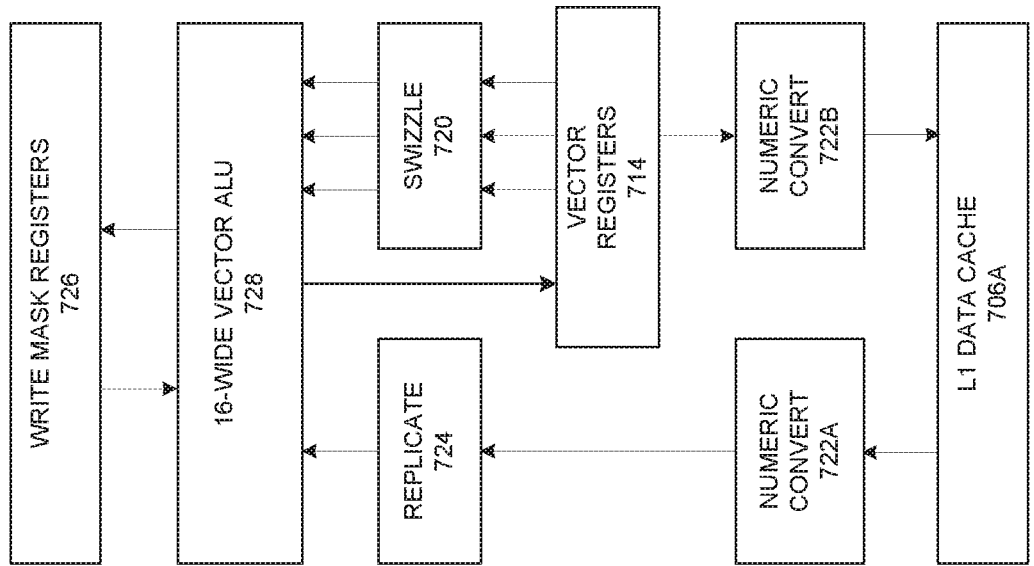
FIG. 7B is a block diagram of an embodiment of an expanded view of part of the processor core of FIG. 7A.
Figure 7A:
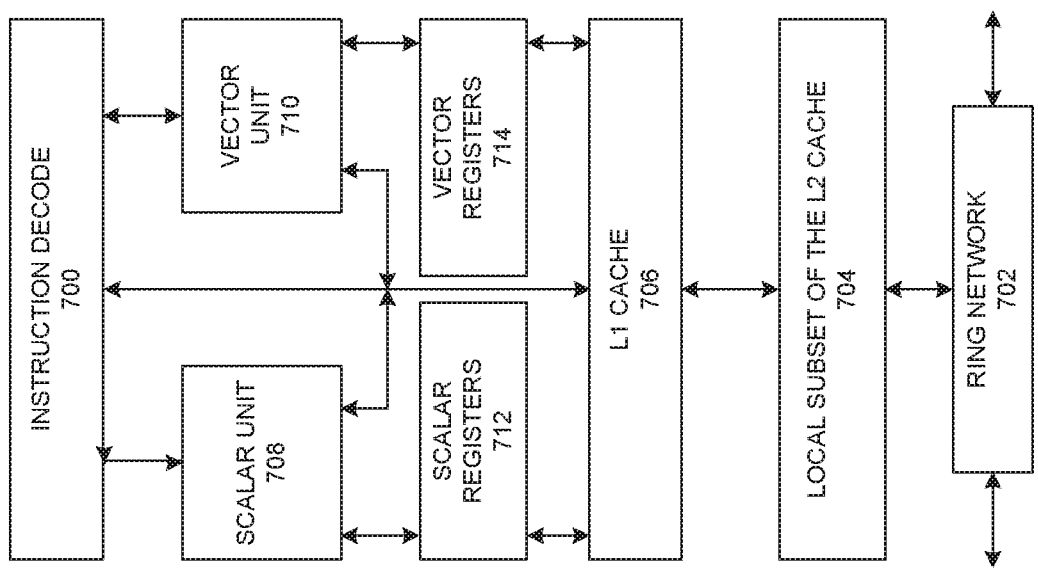
FIG. 7A is a block diagram of an embodiment of a single processor core, along with its connection to the on-die interconnect network, and with its local subset of the Level 2 (L2) cache.

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Processor with Integrated Memory Controller and Graphics

Figure 8:
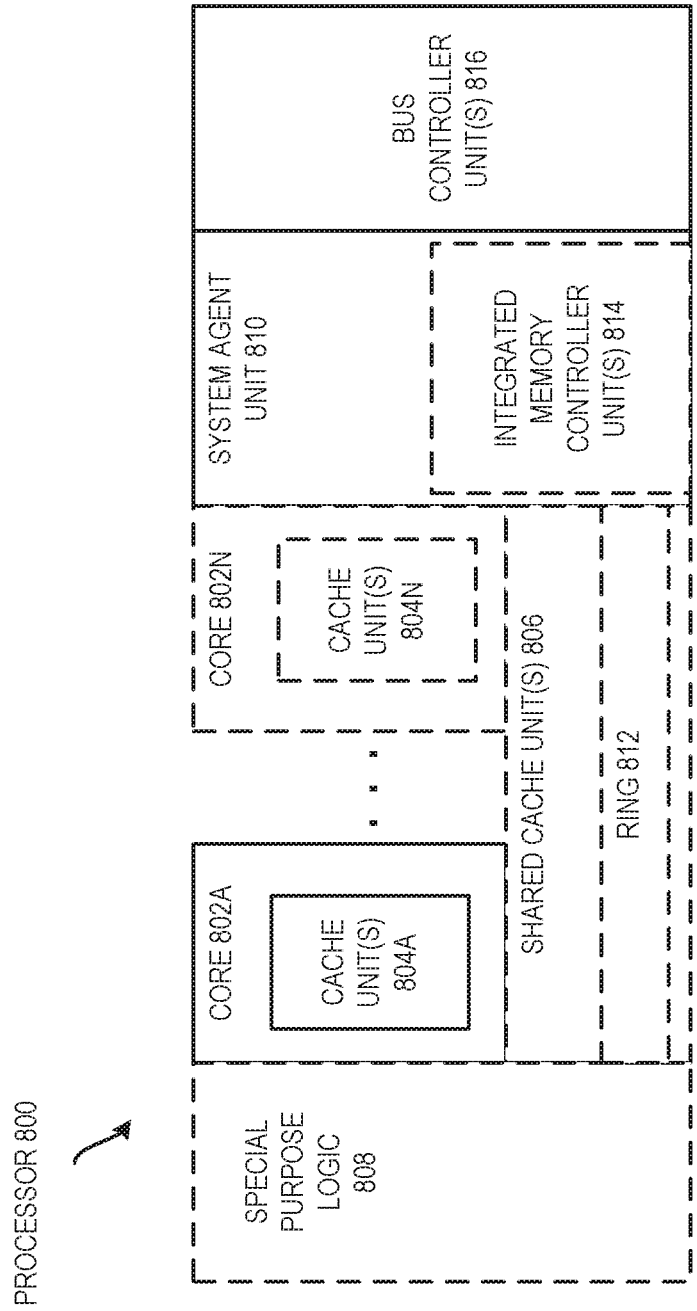
FIG. 8 is a block diagram of an embodiment of a processor that may have more than one core, may have an integrated memory controller, and may have integrated graphics.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
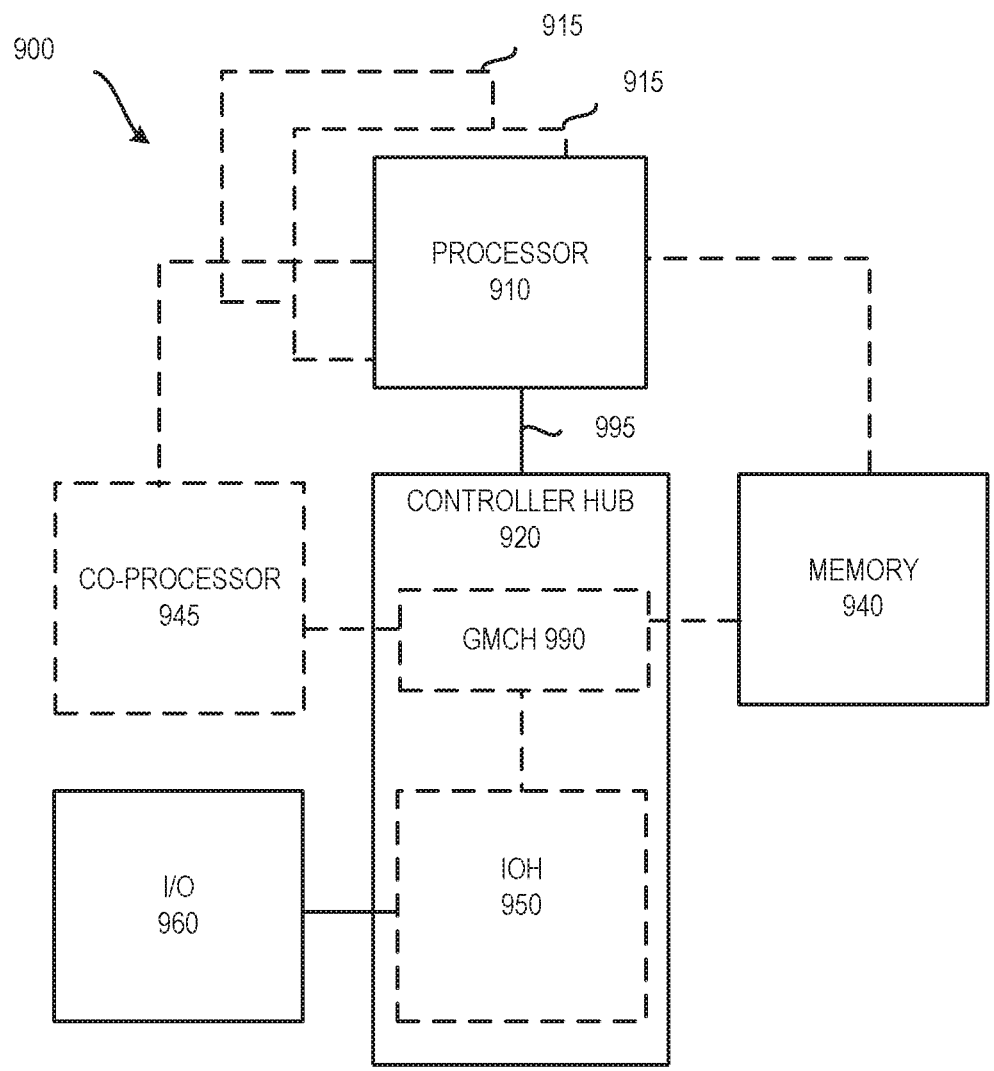
FIG. 9 is a block diagram of a first embodiment of a computer architecture.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
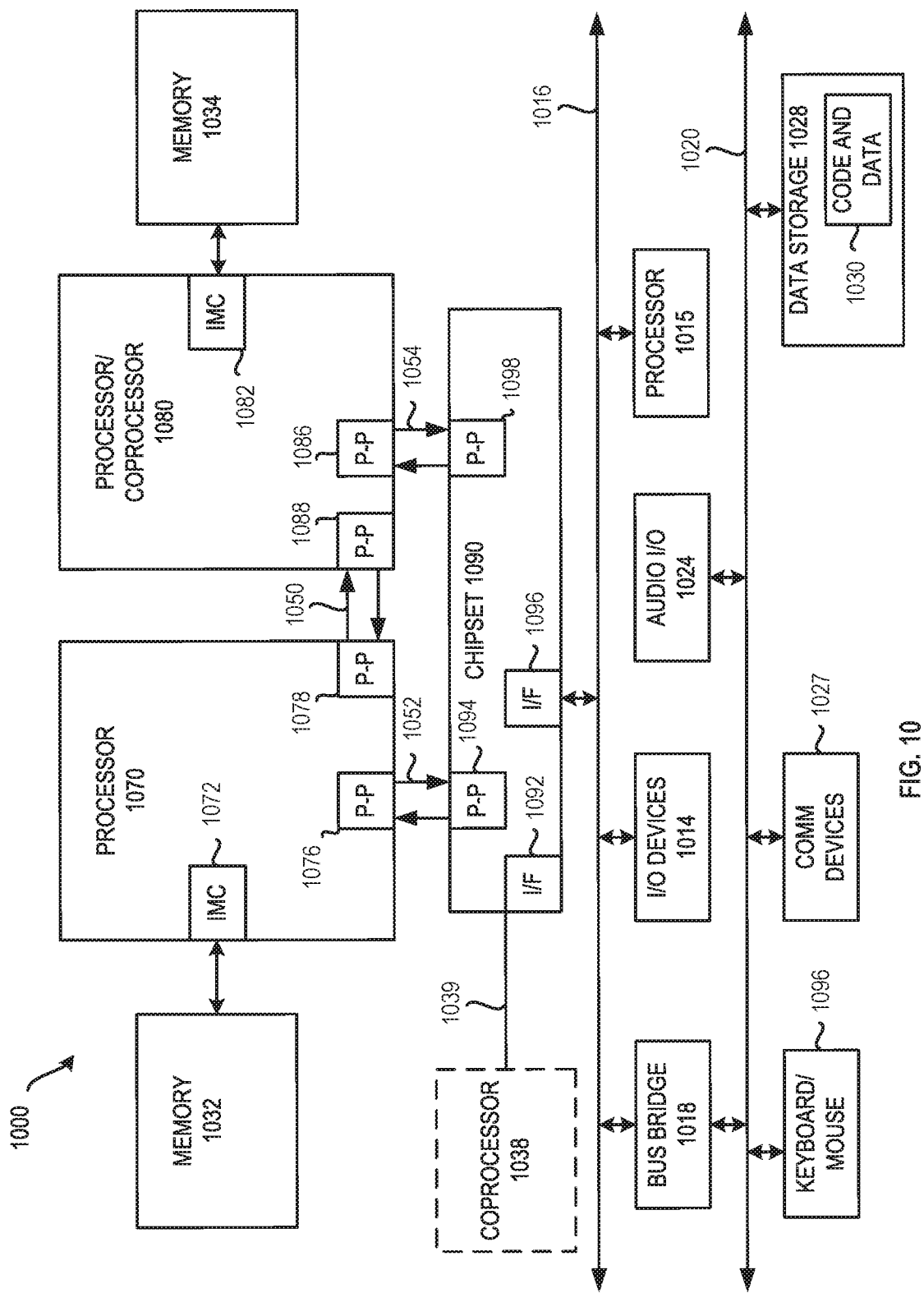
FIG. 10 is a block diagram of a second embodiment of a computer architecture.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
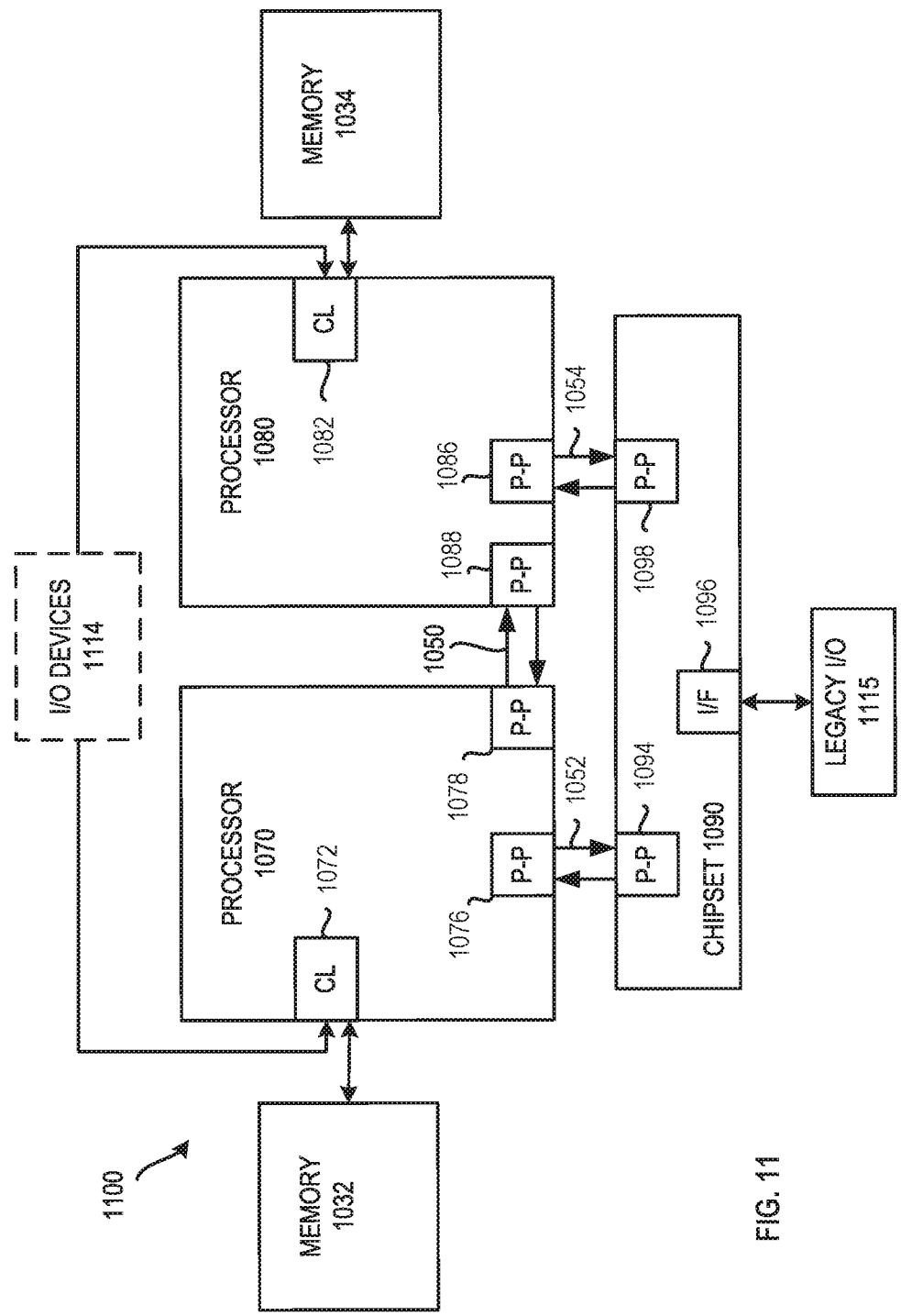
FIG. 11 is a block diagram of a third embodiment of a computer architecture.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
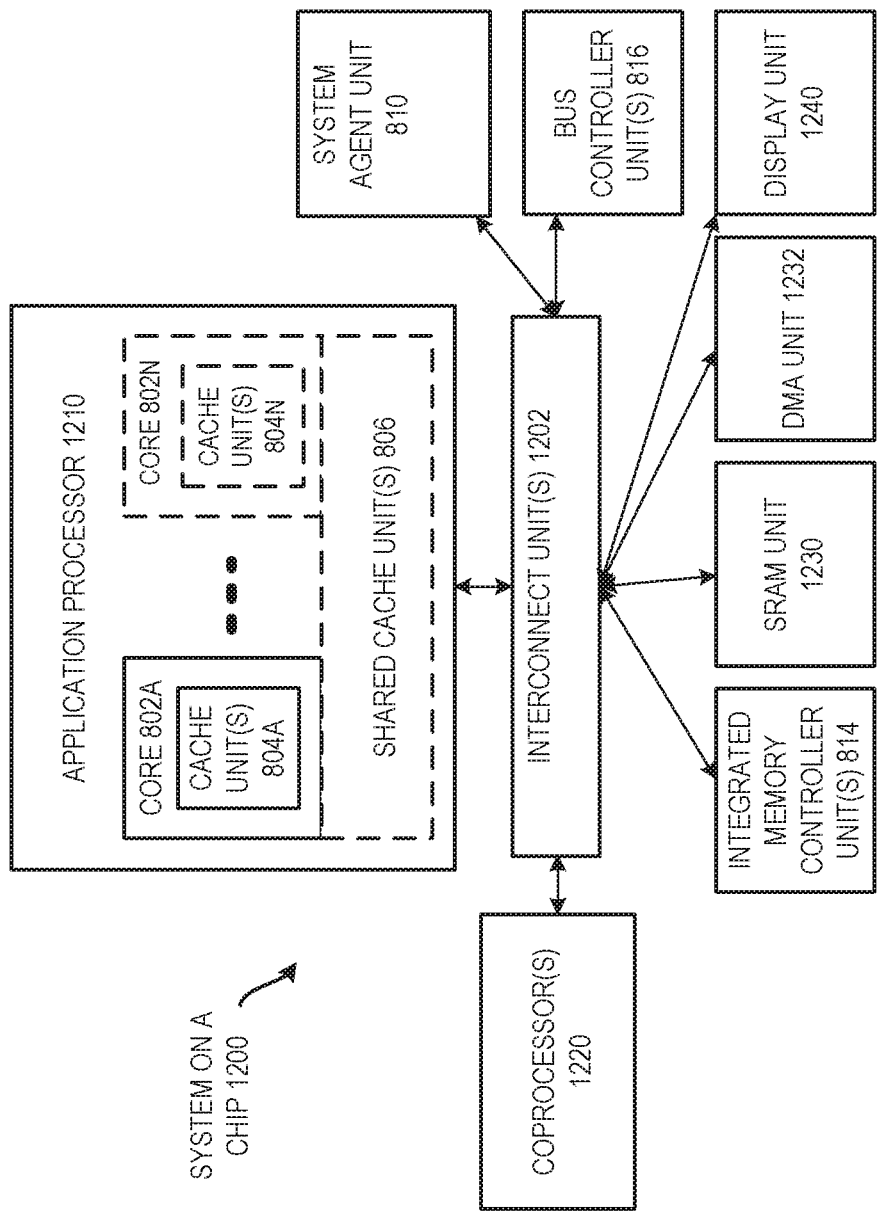
FIG. 12 is a block diagram of a fourth embodiment of a computer architecture.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 202A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
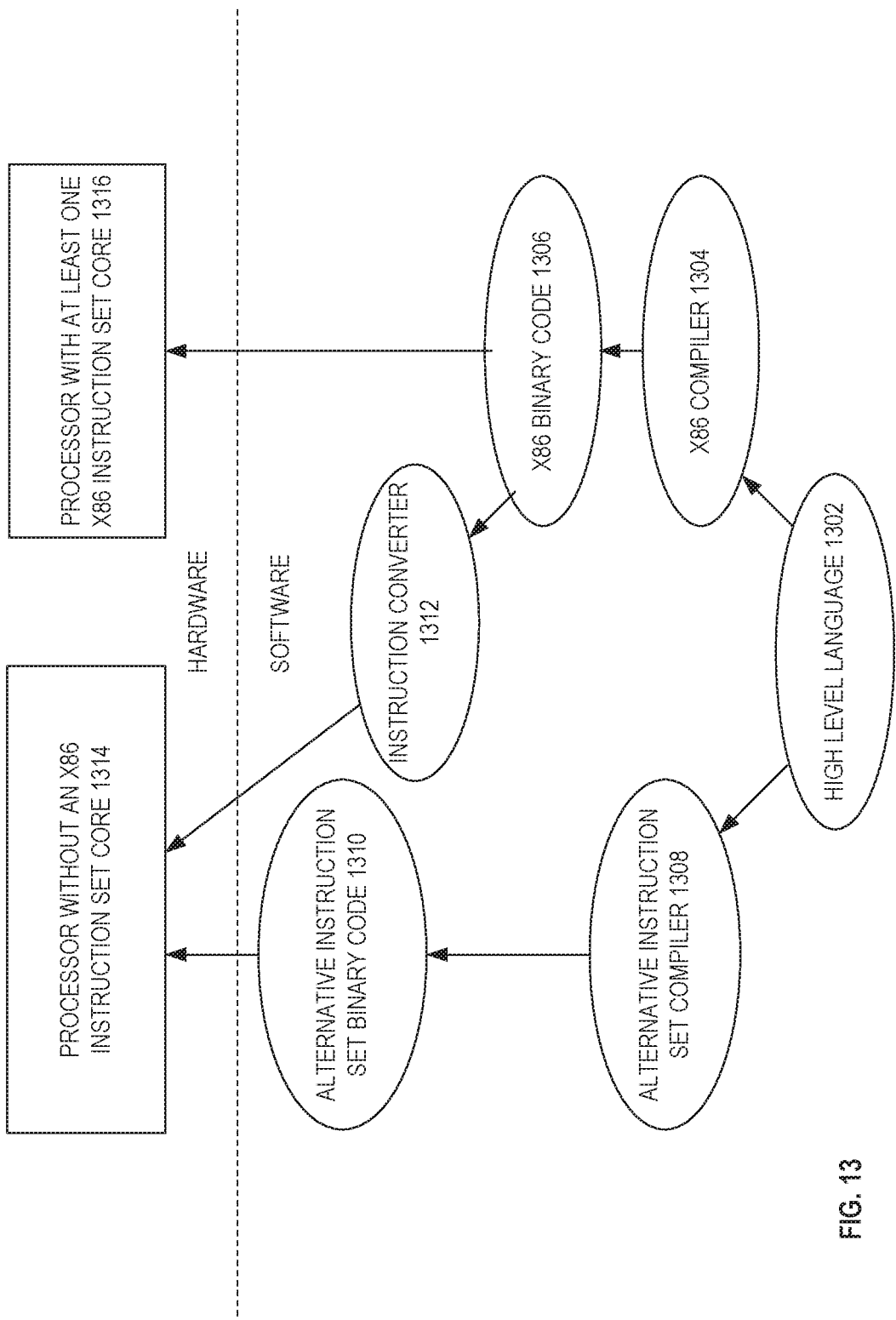
FIG. 13 is a block diagram of use of a software instruction converter to convert binary instructions in a source instruction set to binary instructions in a target instruction set, according to embodiments of the invention.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Components, features, and details described for any of the processors disclosed herein may optionally apply to any of the methods disclosed herein, which in embodiments may optionally be performed by and/or with such processors. Any of the processors described herein in embodiments may optionally be included in any of the systems disclosed herein. Any of the instructions disclosed herein in embodiments may optionally be performed by and/or with any of the processors disclosed herein, optionally in some embodiments having any of the microarchitectures shown herein, and optionally in some embodiments included in any of the systems shown herein. Accordingly, features and details described for any of the instructions disclosed herein may in some embodiments therefore optionally apply to any of the processors and/or systems disclosed herein which may be used to perform those instructions.

Processor components disclosed herein may be said to be operative, configured, capable, or able to perform an operation. For example, a decoder may be to decode an instruction, an execution unit may be to store a result, etc. For clarity, it is to be understood that these expressions do not imply that the processor components are in operation or use, but rather refer to what the processor components are capable of doing or able to do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The components disclosed herein and the methods depicted in the preceding figures may be implemented with logic, modules, or units that includes hardware (e.g., transistors, gates, circuitry, etc.), firmware (e.g., a non-volatile memory storing microcode or control signals), software (e.g., stored on a non-transitory computer readable storage medium), or a combination thereof. In some embodiments, the logic, modules, or units may include at least some or predominantly a mixture of hardware and/or firmware potentially combined with some optional software.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example 1 is a processor including a decode unit to decode a read from memory instruction. The read from memory instruction is to indicate a source memory operand and a destination storage location. The processor also includes an execution unit coupled with the decode unit. The execution unit, in response to the read from memory instruction, is to read data from the source memory operand, store an indication of defective data in an architecturally visible storage location, when the data is defective, and complete execution of the read from memory instruction without causing an exceptional condition, when the data is defective.

Example 2 includes the processor of Example 1, optionally in which the execution unit, in response to the read from memory instruction, is to read the data from a block storage memory location, which is to be in a physical memory address space that is addressable by the read from memory instruction, and optionally in which the processor includes a general-purpose central processing unit (CPU).

Example 3 includes the processor of Example 1, optionally in which the decode unit is to decode a second read from memory instruction, which is to have a same opcode as the read from memory instruction, and which is to indicate a second source memory operand and a second destination storage location. Optionally in which the execution unit, in response to the second read from memory instruction, is to read second data from the second source memory operand, store the second data to the second destination storage location, when the second data is not defective, and store an indication that the second data is not defective in the architecturally visible storage location, when the second data is not defective.

Example 4 includes the processor of Example 1, optionally in which the execution unit, in response to the read from memory instruction, before the indication of the defective data is stored, is to determine whether the data that is defective was read from a block storage memory location.

Example 5 includes the processor of Example 4, optionally in which the execution unit, in response to the read from memory instruction, is to determine to store the indication of the defective data, when the data is defective, and when the data that is defective was read from the block storage memory location.

Example 6 includes the processor of Example 5, optionally in which the decode unit is to decode a second read from memory instruction, which is to have a same opcode as the read from memory instruction, and which is to indicate a second source memory operand. Optionally in which the execution unit, in response to the second read from memory instruction, is to read second data from the second source memory operand, determine that the second data was not read from a block storage memory location, when the second data is defective, and cause an exceptional condition before completing execution of the second read from memory instruction.

Example 7 includes the processor of Example 6, optionally in which the execution unit, in response to the second read from memory instruction, is to cause the exceptional condition, which is to be a machine check exception.

Example 8 includes the processor of Example 1, further including logic to detect that the data is defective based on one at least one of a data parity error and an error correction code (ECC) error.

Example 9 includes the processor of Example 1, optionally in which the decode unit is also to decode a second read from memory instruction, which is to have been included in an instruction set prior to the read from memory instruction, and optionally in which the processor, in response to the second read from memory instruction, is to cause an exceptional condition, when data that is defective is read.

Example 10 includes the processor of any one of Examples 1 to 9, optionally in which the decode unit is to decode the read from memory instruction that is to indicate a general-purpose register as the architecturally visible storage location, and optionally in which the execution unit, in response to the read from memory instruction, is to store the indication of the defective data in the general-purpose register, when the data is defective.

Example 11 includes the processor of any one of Examples 1 to 9, optionally in which the decode unit is to decode the read from memory instruction that is to indicate at least one condition code bit as the architecturally visible storage location, and optionally in which the execution unit, in response to the read from memory instruction, is to store the indication of the at least one condition code bit, when the data is defective.

Example 12 includes the processor of any one of Examples 1 to 9, optionally in which the decode unit is to decode the read from memory instruction that is to indicate the destination storage location that is to be a destination memory operand, and optionally in which the read from memory instruction is to indicate a second architecturally visible storage location that is to store an amount of data that is to be stored from the source memory operand to the destination memory operand.

Example 13 includes the processor of any one of Examples 12, optionally in which the execution unit, in response to the read from memory instruction, is to store an updated amount of data in the second architecturally visible storage location, the updated amount of data to indicate how much of the amount of data has been stored to the destination storage location when the data that is defective was read.

Example 14 includes the processor of any one of Examples 1 to 9, optionally in which the decode unit is to decode the read from memory instruction that is to indicate the destination storage location that is to be a register of the processor.

Example 15 is a method performed by a processor including receiving a read from memory instruction. The read from memory instruction indicating a source memory operand and a destination storage location. The method includes reading data from the source memory operand, in response to the read from memory instruction. The method includes storing an indication of defective data in an architecturally visible storage location, when the data is defective, in response to the read from memory instruction. The method includes completing execution of the read from memory instruction without causing an exceptional condition, when the data is defective, in response to the read from memory instruction.

Example 16 includes the method of Example 15, further including receiving a second read from memory instruction having a same opcode as the read from memory instruction, and indicating a second source memory operand and a second destination storage location. The method also includes reading second data from the second source memory operand, in response to the second read from memory instruction. The method also includes storing the second data to the second destination storage location, when the second data is not defective, in response to the second read from memory instruction. The method also includes storing an indication that the second data is not defective in the architecturally visible storage location, when the second data is not defective, in response to the second read from memory instruction.

Example 17 includes the method of Example 15, further including, in response to the read from memory instruction, before storing the indication of the defective data, determining whether the data that is defective was read from a block storage memory location.

Example 18 includes the method of Example 17, further including determining to store the indication of the defective data, when the data is defective, and when the data that is defective was read from the block storage memory location, optionally in which a determination would be made to cause an exceptional condition if the defective data was instead not read from the block storage memory location.

Example 19 includes the method of Example 15, optionally in which said receiving includes receiving the instruction indicating the destination storage location which is a destination memory operand, and indicating a second architecturally visible storage location storing an indication of an amount of data to be stored from the source memory operand to the destination memory operand.

Example 20 includes the method of Example 15, optionally in which said reading includes reading the data from a block storage memory location, which is in a physical memory address space that is addressable by the read from memory instruction, and optionally in which the processor includes a general-purpose central processing unit (CPU).

Example 21 includes the method of Example 15, further including, privileged system software performing one of replacing the data that is defective with non-defective data, and fixing the data that is defective so that it is not defective.

Example 22 is a system to process instructions including an interconnect, and a processor coupled with the interconnect. The processor is to receive a read from memory instruction. The read from memory instruction to indicate a source memory operand and a destination storage location.

The processor, in response to the read from memory instruction, is to read data from the source memory operand, store an indication of defective data in an architecturally visible storage location, when the data is defective, complete execution of the read from memory instruction without causing an exceptional condition, when the data is defective. The system also includes a dynamic random access memory (DRAM) coupled with the interconnect. The DRAM storing a set of instructions. The set of instructions, when performed by the system, to cause the system to access the indication of the defective data that is stored in the architecturally visible storage location, and perform one of replace the data that is defective with non-defective data and fix the data that is defective so that it is not defective.

Example 23 includes the system of Example 22, optionally in which the processor, in response to the read from memory instruction, before the indication of the defective data is stored, is to determine whether the data that is defective was read from a block storage memory location.

Example 24 is an article of manufacture including a non-transitory machine-readable storage medium. The non-transitory machine-readable storage medium storing a plurality of instructions including a read from memory instruction. The read from memory instruction, if executed by a machine, is to cause the machine to perform operations including read data from a source memory operand that is to be indicated by the read from memory instruction, in response to the read from memory instruction. Also, to store an indication of defective data in an architecturally visible storage location, when the data is defective, in response to the read from memory instruction, and complete execution of the read from memory instruction without causing an exceptional condition, when the data is defective, in response to the read from memory instruction.

Example 25 includes the article of manufacture of Example 24, optionally in which the read from memory instruction, if executed by the machine, is to cause the machine to perform operations including, before the indication of the defective data is stored, determine whether the data that is defective was read from a block storage memory location.

What is claimed is:

1. A processor comprising:
   a decode unit to decode a read from memory instruction, the read from memory instruction to indicate a source memory operand and a destination storage location; and
   an execution unit coupled with the decode unit, the execution unit, in response to the decode of the read from memory instruction, to:
   read data from the source memory operand;
   store an indication of defective data in an architecturally visible storage location, when the data is defective, wherein the architecturally visible storage location is one selected from a group consisting of a general-purpose register and at least one condition code bit; and
   complete execution of the read from memory instruction without causing an exceptional condition, when the data is defective.

2. The processor of claim 1, wherein the execution unit, in response to the decode of the read from memory instruction, is to read the data from a block storage memory location, which is to be in a physical memory address space that is addressable by the read from memory instruction, and wherein the processor comprises a general-purpose central processing unit (CPU).

3. The processor of claim 1, wherein the decode unit is to decode a second read from memory instruction, which is to have a same opcode as the read from memory instruction, and which is to indicate a second source memory operand and a second destination storage location, and wherein the execution unit, in response to the decode of the second read from memory instruction, is to:
   read second data from the second source memory operand;
   store the second data to the second destination storage location, when the second data is not defective; and
   store an indication that the second data is not defective in an architecturally visible storage location, when the second data is not defective.

4. The processor of claim 1, wherein the execution unit, in response to the decode of the read from memory instruction, before the indication of the defective data is stored, is to determine whether the data that is defective was read from a block storage memory location.

5. The processor of claim 4, wherein the execution unit, in response to the decode of the read from memory instruction, is to determine to store the indication of the defective data, when the data is defective, and when the data that is defective was read from the block storage memory location.

6. The processor of claim 5, wherein the decode unit is to decode a second read from memory instruction, which is to have a same opcode as the read from memory instruction, and which is to indicate a second source memory operand, and wherein the execution unit, in response to the decode of the second read from memory instruction, is to:
   read second data from the second source memory operand;
   determine that the second data was not read from a block storage memory location, when the second data is defective; and
   cause an exceptional condition before completing execution of the second read from memory instruction.

7. The processor of claim 6, wherein the execution unit, in response to the decode of the second read from memory instruction, is to cause the exceptional condition, which is to be a machine check exception.

8. The processor of claim 1, further comprising logic to detect that the data is defective based on at least one of a data parity error and an error correction code (ECC) error.

9. The processor of claim 1, wherein the decode unit is also to decode a second read from memory instruction, which is to have been included in an instruction set prior to the read from memory instruction, and wherein the processor, in response to the decode of the second read from memory instruction, is to cause an exceptional condition, when data that is defective is read.

10. The processor of claim 1, wherein the decode unit is to decode the read from memory instruction that is to indicate the general-purpose register as the architecturally visible storage location.

11. The processor of claim 1, wherein the decode unit is to decode the read from memory instruction that is to indicate the least one condition code bit as the architecturally visible storage location.

12. The processor of claim 1, wherein the decode unit is to decode the read from memory instruction that is to indicate the destination storage location that is to be a destination memory operand, and wherein the read from memory instruction is to indicate a second architecturally visible storage location that is to store an amount of data that is to be stored from the source memory operand to the destination memory operand.

13. The processor of claim 12, wherein the execution unit, in response to the decode of the read from memory instruction, is to store an updated amount of data in the second architecturally visible storage location, the updated amount of data to indicate how much of the amount of data has been stored to the destination storage location when the data that is defective was read.

14. A method performed by a processor comprising:
receiving a read from memory instruction, the read from memory instruction indicating a source memory operand and a destination storage location;
performing the read from memory instruction, including:
reading data from the source memory operand;
storing an indication of defective data in an architecturally visible storage location, when the data is defective, wherein the architecturally visible storage location is a general-purpose register, at least one condition code bit, or a combination thereof; and
completing execution of the read from memory instruction without causing an exceptional condition, when the data is defective.

15. The method of claim 14, further comprising:
receiving a second read from memory instruction having a same opcode as the read from memory instruction, and indicating a second source memory operand and a second destination storage location;
performing the second read from memory instruction, including:
reading second data from the second source memory operand;
storing the second data to the second destination storage location, when the second data is not defective; and
storing an indication that the second data is not defective in an architecturally visible storage location, when the second data is not defective.

16. The method of claim 14, further comprising, before storing the indication of the defective data, determining whether the data that is defective was read from a block storage memory location.

17. The method of claim 16, further comprising determining to store the indication of the defective data, when the data is defective, and when the data that is defective was read from the block storage memory location, wherein a determination would be made to cause an exceptional condition if the defective data was instead not read from the block storage memory location.

18. The method of claim 14, wherein said receiving comprises receiving the read from memory instruction indicating the destination storage location which is a destination memory operand, and indicating a second architecturally visible storage location storing an indication of an amount of data to be stored from the source memory operand to the destination memory operand.

19. A processor comprising:
decode circuitry to decode a read from memory instruction, the read from memory instruction to indicate a source memory operand and a destination storage location; and
execution circuitry coupled with the decode circuitry, the execution circuitry, in response to the decode of the read from memory instruction, to:
read data from the source memory operand;
determine a type of memory the data was read from;
cause an exceptional condition when the data is defective and when the type of memory is a first type; or
store an indication of defective data, and complete execution of the read from memory instruction without causing an exceptional condition, when the data is defective, and when the type of memory is a second type that is different than the first type.

20. The processor of claim 19, wherein the second type is a block storage type, and wherein the execution circuitry, in response to the decode of the read from memory instruction, is to store the indication of the defective data in an architecturally visible storage location of the processor.

* * * * *